D. M. HOLMES.
Cake-Machine.

No. 220,378. Patented Oct. 7, 1879.

WITNESSES:
Henry N. Miller
C. Sedgwick

INVENTOR:
D. M. Holmes
BY Munn & Co
ATTORNEYS.

UNITED STATES PATENT OFFICE.

DANIEL M. HOLMES, OF ARLINGTON, NEW JERSEY, ASSIGNOR TO LYDIA A. McCOLLUM, OF NEW YORK, N. Y., EXECUTRIX OF THE ESTATE OF JOHN McCOLLUM.

IMPROVEMENT IN CAKE-MACHINES.

Specification forming part of Letters Patent No. 220,378, dated October 7, 1879; application filed March 25, 1879.

*To all whom it may concern:*

Be it known that I, DANIEL M. HOLMES, of Arlington, in the county of Hudson and State of New Jersey, have invented a new and useful Improvement in Cake-Machines, of which the following is a specification.

Figure 1:
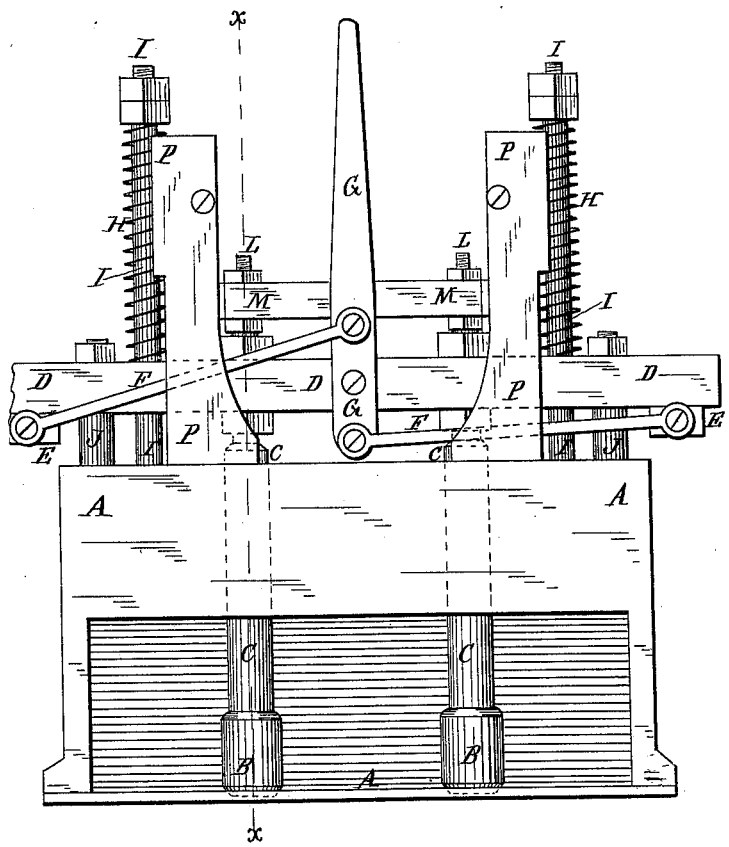
Figure 2:
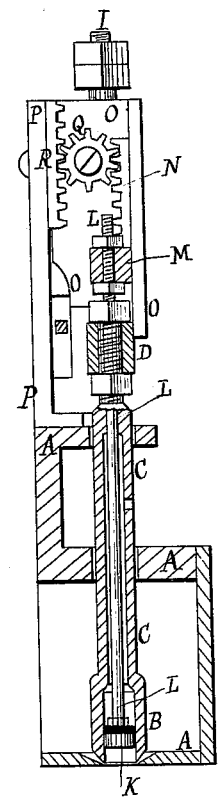
Figure 3:
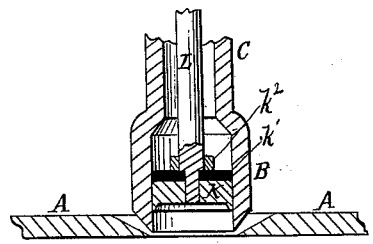

Figure 1 is a rear view of the discharge-compartment of the dough-box of a cake-machine and its attachments. Fig. 2 is a vertical cross-section of the same, taken through the line $x$ $x$, Fig. 1. Fig. 3 is a detail section of the cutters and piston enlarged.

Similar letters of reference indicate corresponding parts.

The object of this invention is to improve the construction of the cake-machines for which Letters Patent Nos. 174,244 and 188,366 were granted February 29, 1876, and March 13, 1877, respectively, Daniel M. Holmes, inventor, to facilitate the discharge of the cakes from the cutters.

The invention consists in the combination, with pistons and cutters, of the sliding rack, the sliding plate provided with the pivoted gear-wheel, the stationary rack, and the standards with the cross-bar attached to the piston-rods, the cross-bar attached to the cutter-tubes, and the discharge-compartment of the dough-box, as hereinafter fully described.

A represents the discharge-compartment of the dough-box of a cake-machine, from which the dough escapes through holes in its bottom. The edges of the bottom of the compartment A around its discharge-holes are beveled, as shown in Figs. 2 and 3, with a long bevel.

As the dough passes out through the discharge-holes it is pinched off by the tubular cutters B, which are beveled upon their outer edges with a shorter bevel than the discharge-holes in the bottom plate.

The tubular cutters B are formed upon or attached to the enlarged lower ends of the tubes C, which pass up through holes in the top of the compartment A and through holes in the cross-bar D, and are secured in place by nuts screwed upon them above and below the said cross-bar D.

The lower sides of the ends of the cross-bar D have dovetailed grooves formed in them to receive the dovetailed upper sides of the blocks E, against which the push-rods operate to raise the cross-bar D, and with it the cutters B. The push-rods are not shown in the drawings.

The blocks E are slid out and in to throw the cutters B into and out of gear with the push-rods by the connecting-bars F, the outer ends of which are pivoted to the said blocks, and their inner ends are pivoted to the lever G upon the opposite sides of and equally distant from its pivoting-point. The lever G is pivoted to the center of the side of the cross-bar D.

The cutters B are thrown down to cut off the dough by the spiral springs H, placed upon the rods I. The lower ends of the springs H rest upon the upper side of the cross-bar D, and their upper ends rest against nuts screwed upon the upper ends of the rods I. The rods I pass down through holes in the cross-bar D, and their lower ends are rigidly attached to the top of the compartment A.

The downward movement of the cross-bar D, and consequently of the cutters B, is limited by the stop-pins J, the upper ends of which are attached to the said cross-bar D, and their lower ends strike against the top of the compartment A.

In the enlarged lower part of the tubular rods C are placed pistons K, the lower sides of which may be concaved, and which are attached to the lower ends of the rods L, and which are made to move up and down air-tight within the said enlarged part by packing $k^1$, placed upon their upper sides, and secured in place by nuts $k^2$ screwed upon the said rods L.

The rods L pass up through the upper parts of the tubes C, and through the cross-bar M, to which they are secured by nuts screwed upon them above and below the said cross-bar.

To one side of the ends of the cross-bar M are secured the lower ends of two rack-bars, N, which slide along the flanged edges of the plates O. The lower ends of the plates O are attached to the cross-bar D, and their other edges are flanged and slide in grooves in the standards P, attached at their lower ends to the top of the compartment A.

To the inner sides of the upper parts of the plates O are pivoted the gear-wheels Q, the teeth of which upon one side mesh into the teeth of the sliding racks N, and upon the other side mesh into the teeth of the stationary racks R, attached to or formed upon the standards P.

The cavities of the tubes C are made larger than the rods L, and the said tubes C have holes in their sides, to allow air to pass in and out freely as the pistons K move down and up.

With this construction, as the cutters B are raised by the upward movement of the cross-bar D, the pistons K will be raised twice as far as the said cutters B, and as the cutters B descend the pistons K will be forced down, forcing the air below them against the cakes of dough cut out by the said cutters, and causing them to drop promptly without anything but air touching them.

Having thus described my invention, I claim as new and desire to secure by Letters Patent—

The combination, with the pistons and cutters, of the sliding rack N, the sliding plate O, provided with the pivoted gear-wheel Q, the stationary rack R, and the standards P with the cross-bar M, attached to the piston-rods L, the cross-bar D, attached to the cutter-tubes C, and the compartment A, substantially as herein shown and described.

DANIEL M. HOLMES.

Witnesses:
JAMES T. GRAHAM,
C. SEDGWICK.